United States Patent
Baldwin et al.

(10) Patent No.: US 7,492,057 B2
(45) Date of Patent: Feb. 17, 2009

(54) HIGH RELIABILITY DC POWER DISTRIBUTION SYSTEM

(76) Inventors: Mark H. Baldwin, 907 Soaring Eagle Ct., Davidsonville, MD (US) 21035; David E. Geary, 13805 Heatherstone Dr., Bowie, MD (US) 20720

( * ) Notice: Subject to any disclaimer, the term of this patent is extended or adjusted under 35 U.S.C. 154(b) by 148 days.

(21) Appl. No.: 11/256,881

(22) Filed: Oct. 24, 2005

(65) Prior Publication Data
US 2006/0097578 A1  May 11, 2006

Related U.S. Application Data (60) Provisional application No. 60/626,679, filed on Nov. 10, 2004.

(51) Int. Cl.
*H02J 7/00* (2006.01)
*H02J 9/00* (2006.01)
(52) U.S. Cl. ............................. 307/64; 307/66
(58) Field of Classification Search ............ 307/64–66, 307/43, 45–46
See application file for complete search history.

(56) References Cited

U.S. PATENT DOCUMENTS

| | | | |
|---|---|---|---|
| 4,239,978 A | 12/1980 | Kofink | 307/16 |
| 5,576,940 A | 11/1996 | Steigerwald et al. | 363/17 |
| 5,646,458 A | 7/1997 | Bowyer et al. | 307/67 |
| 6,133,716 A | 10/2000 | Schutten | 322/40 |
| 6,175,166 B1 | 1/2001 | Bapat | 307/64 |
| 6,239,513 B1 | 5/2001 | Dean et al. | 307/64 |
| 6,255,743 B1 | 7/2001 | Pinkerton et al. | 290/90 |
| 6,304,006 B1 | 10/2001 | Jungreis | 307/69 |
| 6,463,738 B1 | 10/2002 | Pinkerton et al. | 60/646 |
| 6,465,910 B2 | 10/2002 | Young et al. | 307/64 |
| 6,487,096 B1 | 11/2002 | Gilbreth et al. | 363/75 |
| 6,507,506 B1 | 1/2003 | Piñas et al. | 363/79 |
| 6,559,559 B2 | 5/2003 | Cratty | 307/64 |
| 6,573,626 B1 | 6/2003 | Gosebruch et al. | 310/74 |
| 6,611,068 B2 | 8/2003 | Cratty | 307/64 |
| 6,657,320 B1 | 12/2003 | Andrews et al. | 307/64 |
| 6,683,389 B2 | 1/2004 | Geis | 290/40 |
| 6,737,763 B2 | 5/2004 | Liu et al. | 307/58 |
| 6,746,250 B2 | 6/2004 | Blutbacher | 439/34 |
| 6,762,595 B2 | 7/2004 | Tamai et al. | 323/266 |
| 6,788,029 B1 | 9/2004 | Gabrys | 322/4 |
| 2003/0015873 A1 | 1/2003 | Khalizadeh et al. | |
| 2003/0137196 A1 | 7/2003 | Liran | |
| 2003/0160514 A1 | 8/2003 | Rajagopalan | |
| 2004/0070278 A1 | 4/2004 | Divan et al. | |
| 2004/0150374 A1* | 8/2004 | Kraus | 322/4 |
| 2004/0155527 A1 | 8/2004 | Bryde | |

(Continued)

FOREIGN PATENT DOCUMENTS

JP  2003339118 A  11/2003

*Primary Examiner*—Stephen W Jackson
*Assistant Examiner*—Carlos Amaya
(74) *Attorney, Agent, or Firm*—Whiteford, Taylor & Preston LLP; Jeffrey C. Maynard; Gregory M. Stone (57) ABSTRACT

A high voltage DC power distribution system that eliminates static switches and batteries. Flywheel energy storage devices and extremely reliable, high power DC/DC converters provide at a lower cost, more reliable, noise and harmonic free, critical electrical power directly at equipment racks at 48 VDC, 24 VDC, 6 VDC, 2 VDC, or any other desired DC voltage level.

24 Claims, 7 Drawing Sheets

U.S. PATENT DOCUMENTS

| | | |
|---|---|---|
| 2004/0207266 A1 | 10/2004 | Abel et al. |
| 2005/0006598 A1 | 1/2005 | Pearl |
| 2006/0061213 A1 * | 3/2006 | Michalko ................ 307/9.1 |

* cited by examiner

PRIOR ART

HIGH RELIABILITY DC POWER DISTRIBUTION SYSTEM

CROSS REFERENCE TO RELATED APPLICATION

This application is based upon and claims benefit of copending and co-owned U.S. Provisional Patent Application Ser. No. 60/626,679 entitled "High Reliability DC Power Distribution System for Critical Power Environments," filed with the U.S. Patent and Trademark Office on Nov. 10, 2004 by the inventors herein, the specification of which is incorporated herein by reference.

BACKGROUND OF THE INVENTION

1. Field of the Invention

This invention relates generally to electrical distribution systems and in particular to distribution systems for direct current electrical power.

2. Background of the Prior Art

High-density computer environments utilizing alternating current (AC) power supply blade server technology are presenting major challenges to owners and operators. Typical facility infrastructures cannot accommodate the added heat loads and reliability requirements of such high-density installations.

Critical components, such as computers, etc., require a highly reliable source of electric power and can generally tolerate only slight differences from standard 120 VAC, 60 Hz power that is then protected by an uninterruptible power supply (UPS). A UPS generally protects a computer against four different power problems:

Voltage surges and spikes—Times when the voltage on the line is greater than it should be.

Voltage sags—Times when the voltage on the line is less than it should be.

Total power failure—Times when a line goes down or a fuse blows somewhere on the grid or in the building.

Frequency differences—Times when the power is oscillating at something other than 60 Hertz.

Figure 1:
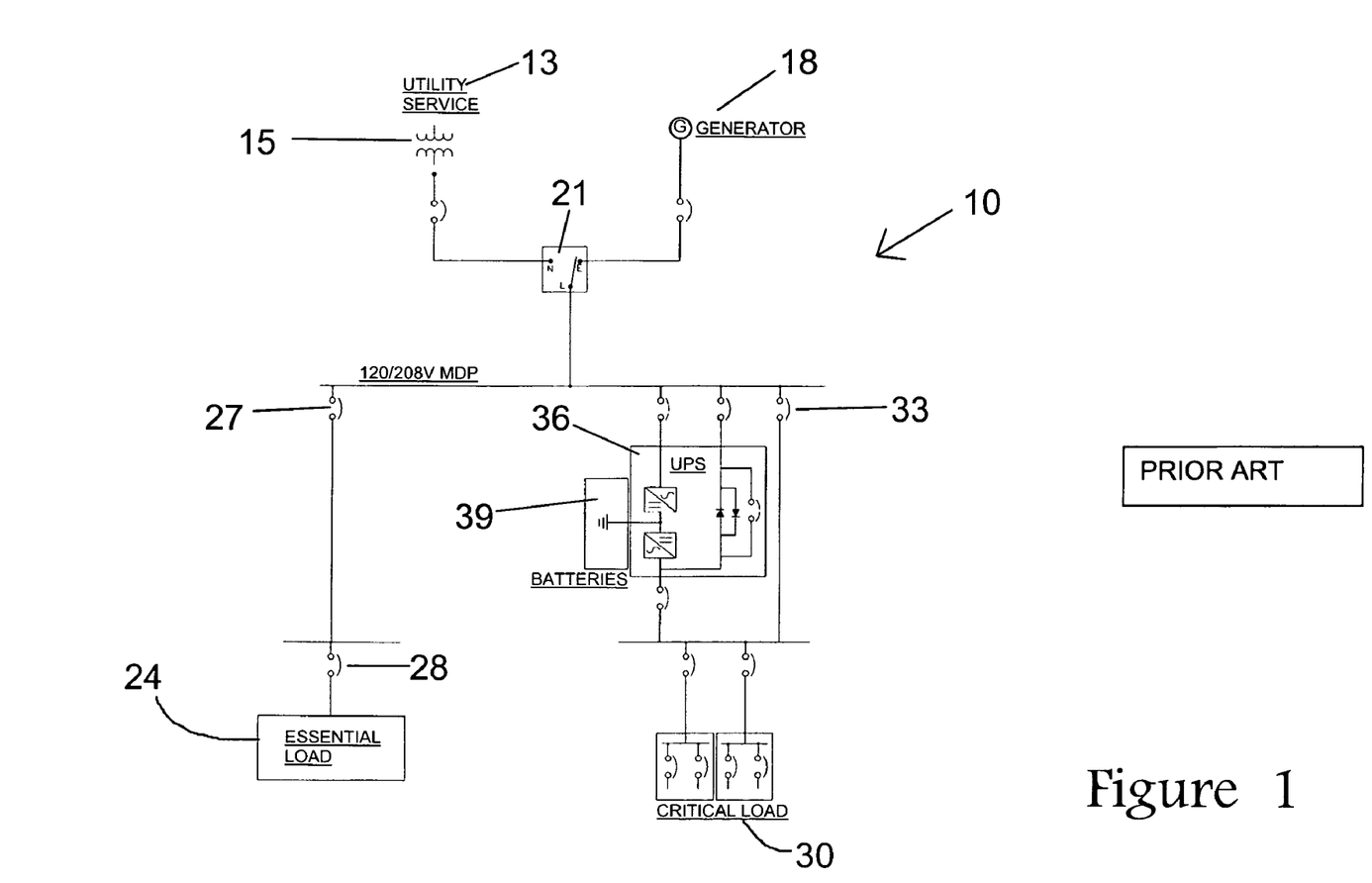
FIG. 1 shows a schematic of a typical small size electrical distribution system according to the prior art.
Figure 2:
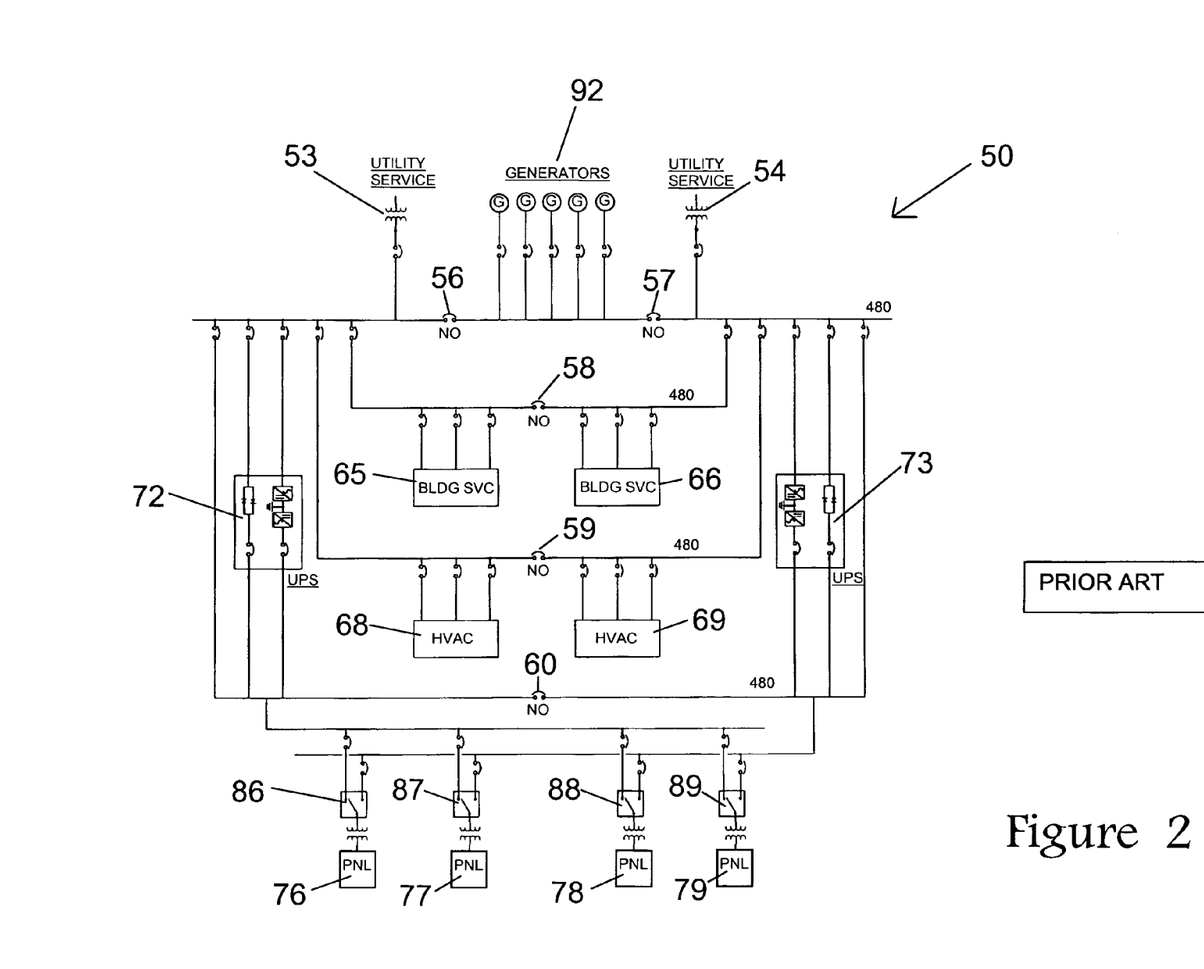
FIG. 2 shows a schematic of a typical medium size electrical distribution system according to the prior art.
Figure 3:
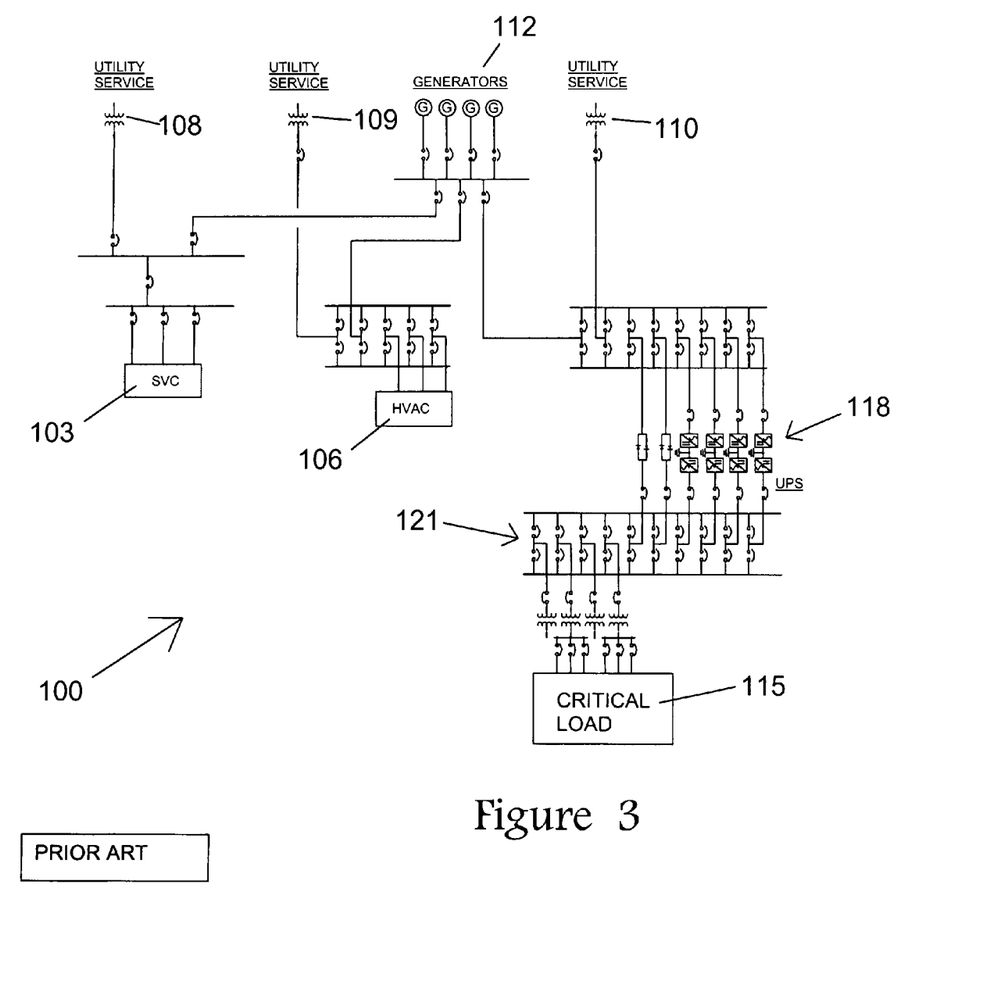
FIG. 3 shows a schematic of a typical large size electrical distribution system according to the prior art.

Recent studies by various organizations and manufacturers have lead to the joint philosophy that more cost effective, more reliable, more maintainable, and more simplified electrical power distribution systems are needed for critical environments. With this in mind, it has been found that typical designs for critical environments utilize similar high cost equipment to provide reliability to critical power environments. All systems utilize components to convert utility provided, alternating current (AC) power to direct current (DC) power for an energy storage interface, such as batteries, back to AC power for plant floor distribution, and then back to DC power for internal equipment utilization. FIGS. 1-3 illustrate typical critical power distribution systems for facilities of different sizes.

SUMMARY OF THE INVENTION

Recent tests demonstrate the ease of combining new technology DC power systems to create a high reliability system topology in a building block methodology. Critical power systems designed around the fact that currently available engine generator systems, when properly maintained, can come on-line very quickly (that is, on the order of 6-10 seconds), coupled with cost-effective, high speed, energy storage flywheels having high voltage DC output, enables cost saving, highly reliable, and reduced maintenance power distribution system options.

High voltage DC power distribution allows for the elimination of high cost static switches and active paralleling of AC sources, since coupling multiple DC sources is as simple as matching output voltages. Currently available extremely reliable, high power DC/DC converters can then provide at a lower cost, more reliable, noise and harmonic free, critical electrical power directly to equipment racks at 48 VDC, 24 VDC, 12 VDC, 9 VDC, or any other desired DC voltage level.

Servers equipped with DC power supplies, instead of AC power supplies, operate with 20-40% less heat, reduce power consumption by up to 30%, increase server reliability, offer flexibility to installations, and decrease maintenance requirements.

It is, therefore, an object of the present invention to provide a high reliability electrical power distribution system that avoids the disadvantages of the prior art.

It is another object of the present invention to provide a power distribution system for DC power requirements. It is a related object of the present invention to enable a power distribution system that eliminates the need to convert AC power to DC power, back to AC power, and then back to DC power.

It is another object of the present invention to reduce or eliminate the need for chemical batteries in a DC power distribution system. It is a related object of the present invention to eliminate the need for static switches and AC paralleling controls.

It is another object of the present invention to eliminate the need for separate uninterruptible power supplies.

Some additional benefits of the present invention include:
1) lower component count resulting in higher system efficiency, greater reliability, less maintenance, and lower cost.
2) modular and flexible design that allows for system growth.
3) energy storage devices that eliminate the need for chemical batteries.
4) modular busway system that enables growth and permits redundant DC sources at critical loads.
5) DC rated plug-in modules that can be energized on the bus without interruption of critical loads.
6) no downstream transfer switches or static switches required.
7) DC power distribution eliminates harmonics found on AC systems.
8) eliminates the need for stand-alone UPS requirements.
9) provides a more efficient interface with "green" power sources that typically produce a DC output, such as wind power, solar power, fuel cells, etc.

The DC electrical power distribution solution described herein provides an additional benefit by helping to lower energy consumption in computer data centers, which, in turn, lowers data center operational costs by reducing equipment heat dissipation by approximately 20-40% and achieving power savings of up to 30%.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

FIG. 1 shows a schematic of a typical small size electrical distribution system, generally indicated as 10, according to the prior art. Normal service AC power is provided by a utility service company 13 and typically enters the facility through a step-down transformer 15 for service up to approximately 300 KVA. For emergency purposes, a standby generator 18 is available for rapid startup upon loss of power from the utility company. A quick acting transfer switch 21 is normally selected to receive power from the utility 13, but can rapidly transfer to the generator 18 on loss of voltage.

Typical line voltage in such a small facility is approximately 120/208 VAC through a single main distribution panel. Essential loads, such as 24, are provided power through isolation breakers 27, 28. Critical loads, such as 30, which may include computers, laboratory equipment, etc., are normally provided power from the main distribution panel through an isolation breaker 33. An uninterruptible power supply 36 usually contains a battery 39 and a pair of power converters. A rectifier that converts the AC line power to DC power continuously charges the battery 39 and provides regulated power through the inverter to the critical loads 30. Upon loss of AC line power, the battery 39 immediately begins to discharge, and the static inverter continues to provide output power to the critical loads 30.

FIG. 2 shows a schematic of a typical medium size, up to approximately 1,000 KVA, electrical distribution system, according to the prior art. In this system, generally indicated as 50, normal service AC power is provided by a utility service company and typically enters the facility through one or more step-down transformers 53, 54. Typically, the electrical distribution system 50 will operate in parallel, with redundant components on each side separated by a plurality of normally open breakers, such as 56, 57, 58, 59, 60.

Typical line voltage in such a medium size facility is approximately 480 VAC through a plurality of distribution panels. Building services 65, 66 and HVAC services 68, 69 may be provided power from either side of the distribution network.

In distribution system 50, a pair of uninterruptible power supplies 72, 73, as described above, provides stable electrical power to critical load panels 76, 77, 78, 79. An important difference from the small distribution system 10 is that the output of the static inverters of the uninterruptible power supply 72, 73 must be the same as the line voltage, i.e. 480 VAC. Another important difference is that the critical load panels 76, 77, 78, 79 are typically provided power through separate quick-acting, static transfer switches 86, 87, 88, 89, which are preferentially supplied from one side of the distribution network or the other, and provide power that is stepped down through transformers to 120/208 VAC.

For emergency power, a plurality of generators 92 can provide AC power to the main distribution panels and to the entire network through breakers 56 or 57.

In a large system, up to approximately 2,000 KVA, as shown in FIG. 3, most essential loads and critical loads are provided electrical power through redundant, parallel power sources. In the distribution system, generally indicated as 100, building service 103 and HVAC 106 are provided power from either the utility company, through step down transformers 108, 109, 110 or emergency generators 112. Critical loads 115 receive electrical power from a plurality of uninterruptible power supplies 118, each having a rectifier, battery storage unit, and static inverter, as described above. Multiple isolation breakers 121 enable selection of various options for providing reliable electrical power to the critical loads 115.

One of the major drawbacks of the typical electrical distribution systems is that, in order to eliminate total loss of power, AC distribution systems must be carefully synchronized by matching both voltage and frequency prior to shifting electrical loads from one power source to another.

Figure 4:
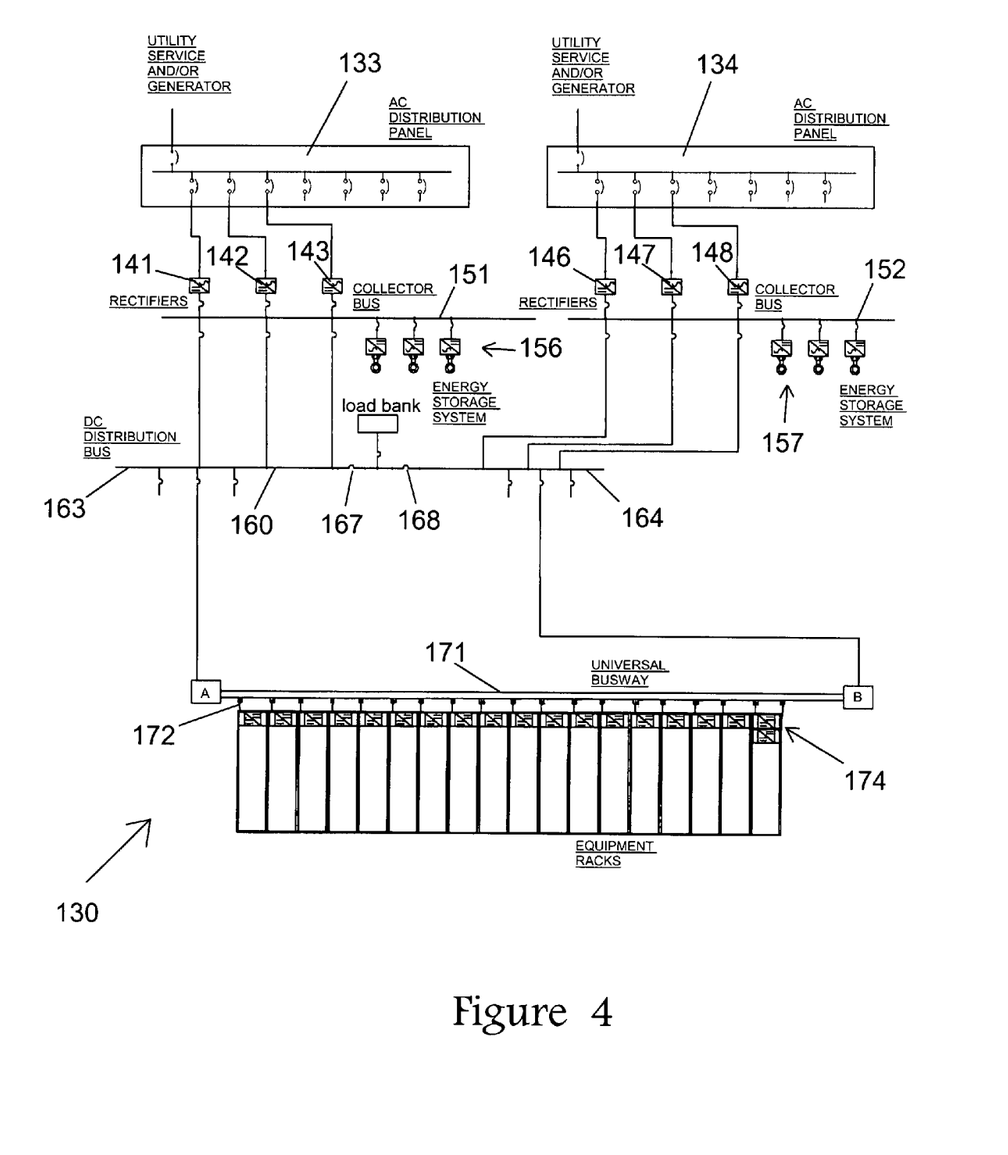
FIG. 4 shows a schematic of a DC electrical power distribution system according to the present invention.

Referring now to FIG. 4, an exemplary high reliability DC power distribution system, indicated generally as 130, is shown. Normal utility power and/or generator power at approximately 277/480 VAC is supplied to distribution panels 133, 134. A plurality of rectifiers, such as 141, 142, 143, and 146, 147, 148 provide 300 VDC to 600 VDC (500 VDC nominal) to collector busses 151, 152. Energy storage systems 156, 157 provide rapid emergency DC power to the collector busses 151, 152 upon loss of AC power to the rectifiers. The collector busses 151, 152 feed power to a distribution bus 160, which may be divided into parallel, redundant busses 163, 164, separated by normally open breakers 167, 168. Distribution bus 160 feeds power to both ends of a universal busway 171 having dedicated drops 172 to a plurality of rack mounted DC-to-DC converters 174 or directly to servers or other equipment that operate at the voltage on the universal busway 171. While the nominal voltage on the universal busway 171 is approximately 500 VDC, high voltage DC power may be approximately 300 VDC to 600 VDC.

An engine/generator—typically a diesel engine system—(not shown in FIGS. 4-6) is on the supply side of the system, typically tied in at the service entrance point for the facility (see FIG. 1). Such engine/generator provides rapid startup, emergency electrical power upon loss of power from the service utility.

Figure 5:
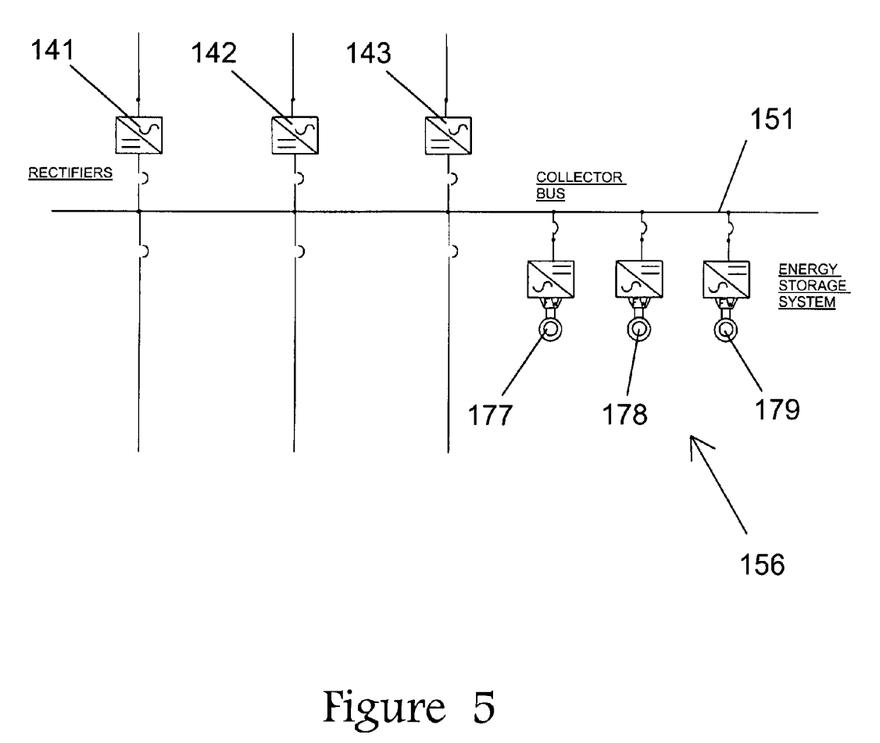
FIG. 5 shows a portion of the distribution system of FIG. 4 for describing additional features according to one embodiment of the present invention.
Figure 6:
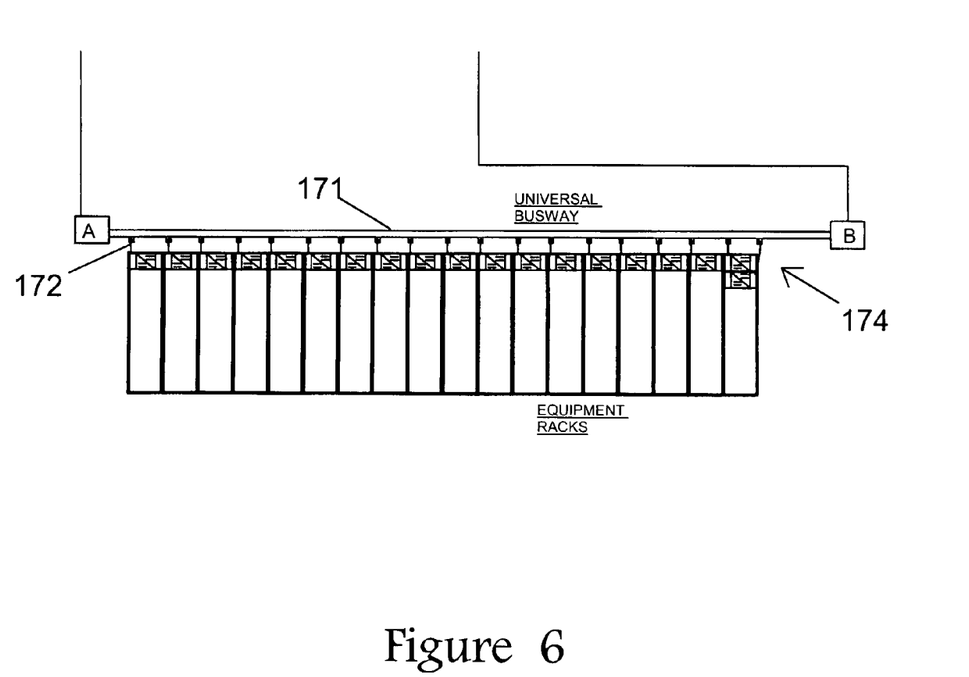
FIG. 6 shows a portion of the distribution system of FIG. 4 for describing additional features according to one embodiment of the present invention.

FIGS. 5 and 6 illustrate enlarged portions of the high reliability DC power distribution system 130. In a preferred embodiment, rectifiers 141, 142, 143 convert utility or generator supplied, three-phase AC power to high voltage DC power. The number of rectifiers should be selected based upon capacity requirements and desired redundancy. A suitable device may be one or more 20 kW modules, such as model C6497VH-s provided by Schaefer, Inc. of Ashland, Mass.

According to the present invention, AC to DC rectifiers are utilized to act as the front-end power source for a high voltage DC distribution system that supports an entire critical operations environment instead of using a single use rectifier for a specific component. In a preferred embodiment, the high voltage DC power may be approximately 300 VDC to 600 VDC (500 VDC nominal). Other appropriate voltages may be used.

Energy storage system 156 comprises flywheel devices 177, 178, 179 that provide DC power ride through. That is, upon loss of utility AC power to the rectifiers, the energy storage system 156 provides power to the collector bus 151 while a backup AC power source, such as an engine-powered generator, is brought on line. In a preferred embodiment, the high voltage DC output level from the energy storage system 156 is selectable and pre-set to match the nominal voltage on the collector bus 151. According to the present invention, the flywheel devices 177, 178, 179 provide ride-through for the entire distribution system instead of as a DC battery link for a typical uninterruptible power supply. No batteries are required in this invention.

A suitable flywheel energy storage device is manufactured by Pentadyne Power Corporation of Chatsworth, Calif. It employs a carbon-fiber flywheel with an integral synchronous reluctance motor-generator. The flywheel is fully levitated by magnetic bearings to eliminate mechanical losses and includes an internal vacuum pump to minimize aerodynamic losses. A plurality of flywheel devices 177, 178, 179 can be added as desired to increase redundancy and, therefore, reliability, without the need for active paralleling controls, which would be required when multiple AC power systems are paralleled.

The universal busway 171 provides a unique application. Instead of providing an AC distribution system with a single feed, busway 171 provides a DC distribution system that can be fed from multiple DC voltage matched sources. Alternatively, busway 171 can be fed from two separate sources, one on each end, utilizing two bus bars each. The busway 171 is intended to have four separate bus bars—each rated approximately 600 VDC. Two bus bars are fed by one source (labeled A in FIGS. 4 and 6) and the other two bus bars are fed by another source (labeled B in FIGS. 4 and 6). The drops from the busway 171 can then be selectable from either source. In a typical embodiment, busway 171 will provide high voltage DC power to equipment rack locations within a compact package having hot swappable/movable connectors that can be fed from separate DC power sources. The high voltage DC power may be approximately 300 VDC to 600 VDC (500 VDC nominal). A suitable busway is the StarLine Track Busway provided by Universal Electric Corporation of Bridgeville, Pa.

DC-to-DC converters 174 take the high voltage DC power from the universal busway 171 and converts to low voltage DC as required at the load rack for critical power load connections. Typical voltage requirements may be 48 VDC, 24 VDC, 9 VDC, 2 VDC, etc. According to the present invention, this unique application provides the necessary equipment voltage at the location of the load itself. Fed from the high voltage DC distribution system, any DC power supply equipment can be fed at any DC voltage utilizing DC-to-DC converters as close as possible to the load itself. This approach greatly increases system efficiency and reliability when redundant systems are used.

Figure 7:
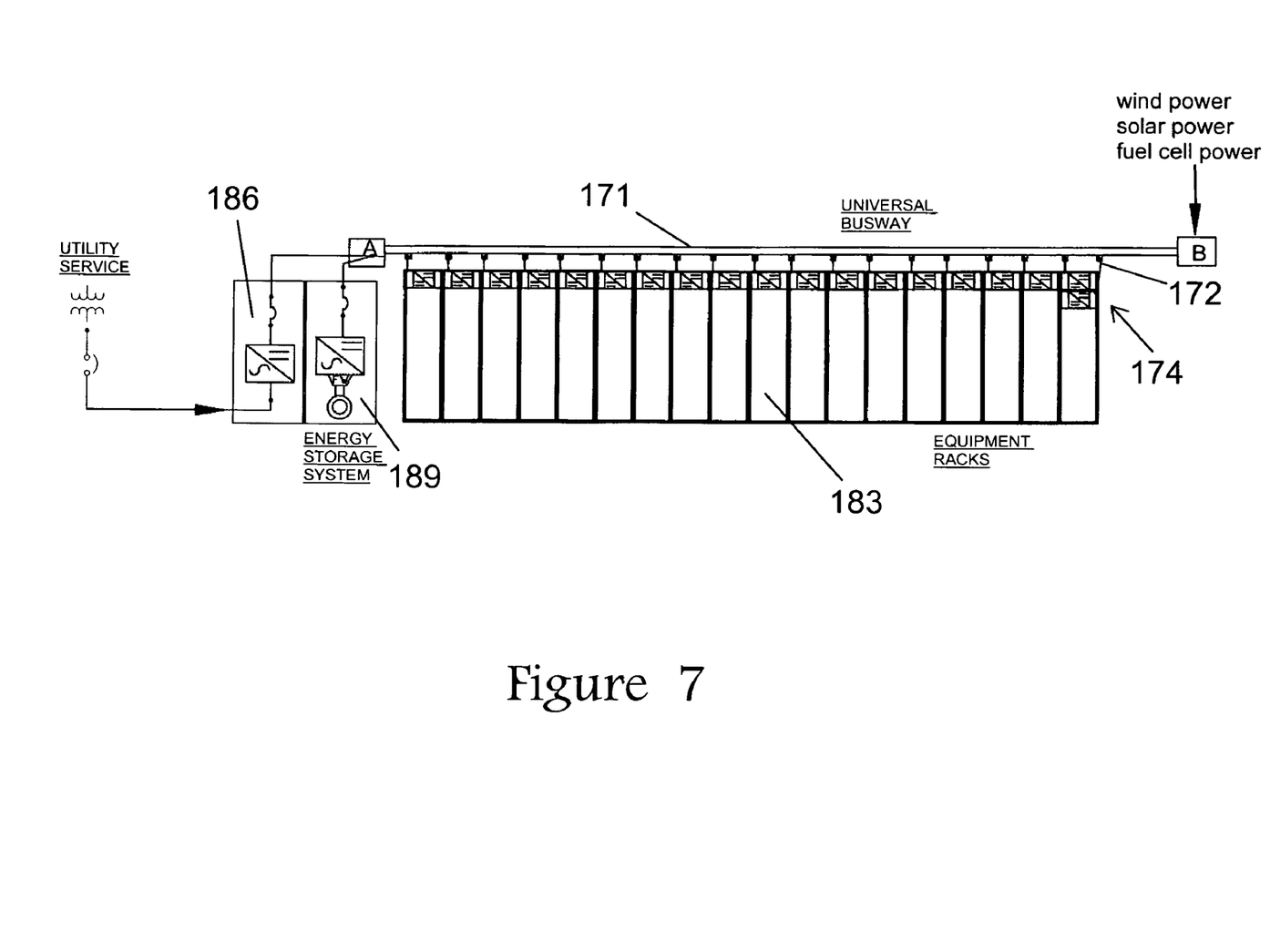
FIG. 7 shows a schematic of a DC electrical power distribution system according to a specific embodiment of the present invention.

Referring to FIG. 7, a specific example of a stand-alone system according to the present invention is illustrated. Critical load equipment racks 183 are connected to the universal busway 171 through individual DC-to-DC converters 174. Normal three-phase utility service power at approximately 480 VAC is provided to the rectifier 186, which supplies the busway 171 at A. Nominal rating for the rectifier rack is 480 VAC input and 520 VDC output. An energy storage system 189 provides DC power ride through. Nominal rating for the energy storage system is 520 VDC input and 500 VDC output. While the system has been described as nominally 500 VDC distribution, other appropriate voltages, such as approximately 300 VDC to 600 VDC may be used.

In some embodiments, a similarly configured, redundant rectifier rack and energy storage system or other power supply, such as wind, solar, or fuel cell power, can be provided to the remaining end of the universal busway at B.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A high reliability DC power distribution system, comprising:
   a first AC power source;
   a second, emergency AC power source;
   at least one AC to DC converter operationally connected to said first and second AC power sources and operationally connected to provide power to a DC collector bus;
   at least one DC energy storage system operationally connected to said DC collector bus, wherein said DC energy storage system provides sufficient ride-through power to said DC collector bus upon loss of said first AC power source to enable said second, emergency AC power source to come on line; and
   a busway comprising not less than four bus bars, in pairs, said busway being independent of said DC collector bus and operationally connected to said DC collector bus and having a plurality of power drops directly to equipment or to equipment racks having DC-to-DC power converters connected thereto,
      wherein each pair of bus bars in said busway is operationally connected to a separate DC power source and wherein both bus bars of each pair are operationally connected to the same DC power source, and said busway enables utilizing plug-in modules for at least two DC power sources.

2. The high reliability DC power distribution system of claim 1, further comprising at least one DC distribution bus operationally connected between said DC collector bus and said busway, wherein said DC distribution bus receives power from said DC collector bus and provides power to said busway.

3. The high reliability DC power distribution system of claim 1, wherein said plug-in modules can be installed at said power drops while said system is energized.

4. The high reliability DC power distribution system of claim 1, wherein said AC to DC converter provides approximately 300-600 VDC power.

5. The high reliability DC power distribution system of claim 4, wherein said AC to DC converter comprises a rectifier.

6. The high reliability DC power distribution system of claim 1, wherein said energy storage system provides approximately 300-600 VDC power.

7. The high reliability DC power distribution system of claim 6, wherein said energy storage system comprises a flywheel energy storage device.

8. The high reliability DC power distribution system of claim 1, wherein said distribution system provides DC power for critical loads.

9. The high reliability DC power distribution system of claim 8, wherein said critical loads are selected from the group consisting of:
   computer blade servers;
   computer server storage devices;
   network interface and control devices; and
   computer data center critical loads.

10. The high reliability DC power distribution system of claim 1, wherein said DC-to-DC converters have output voltages from approximately 4 VDC to approximately 50 VDC, depending on utilization equipment requirements.

11. A stand-alone DC power distribution system, comprising:
   a first source of AC power;
   a first AC to DC converter operationally connected to said first source of AC power and operationally connected to provide DC power to a DC busway, said DC busway comprising not less than four bus bars, in pairs;
   a first DC energy storage device operationally connected to provide DC power to said DC busway; and
   a plurality of power drops directly to equipment or to equipment racks having DC-to-DC power converters connected to said DC busway,
      wherein each pair of bus bars in said busway is operationally connected to a separate DC power source and wherein both bus bars of each pair are operationally connected to the same DC power source, and said busway enables utilizing plug-in modules for at least two DC power sources.

12. The stand-alone DC power distribution system of claim 11, further comprising an emergency AC power source
   wherein said first DC energy storage device provides sufficient ride-through power to said DC busway upon loss of said first source of AC power to enable said emergency AC power source to come on line.

13. The stand-alone DC power distribution system of claim 11, wherein said plug-in modules can be installed at said power drops while said system is energized.

14. The stand-alone DC power distribution system of claim 11, wherein said AC to DC converter provides approximately 300-600 VDC power.

15. The stand-alone DC power distribution system of claim 11, wherein said AC to DC converter comprises a rectifier.

16. The stand-alone DC power distribution system of claim 11, wherein said energy storage device provides approximately 300-600 VDC power.

17. The stand-alone DC power distribution system of claim 16, wherein said energy storage device comprises a flywheel energy storage device.

18. The stand-alone DC power distribution system of claim 11, wherein said distribution system provides DC power for critical loads.

19. The stand-alone DC power distribution system of claim 18, wherein said critical loads are selected from the group consisting of:
   computer blade servers;
   computer server storage devices;
   network interface and control devices; and
   computer data center critical loads.

20. The stand-alone DC power distribution system of claim 11, wherein said DC-to-DC converters have output voltages from approximately 2 VDC to approximately 50 VDC, depending on utilization equipment requirements.

21. The stand-alone DC power distribution system of claim 11, further comprising:
   a second source of AC power;
   a second AC to DC converter operationally connected to said second source of AC power and operationally connected to provide DC power to said DC busway; and
   a second DC energy storage device operationally connected to provide DC power to said DC busway
      wherein DC power is provided to a pair of bus bars in said DC busway and wherein both bus bars of the pair are operationally connected to the same DC power source.

22. The stand-alone DC power distribution system of claim 21, further comprising an emergency AC power source
   wherein said second DC energy storage device provides sufficient ride-through power to said DC busway upon loss of said second source of AC power to enable said emergency AC power source to come on line.

23. The stand-alone DC power distribution system of claim 11, further comprising:
   a high voltage DC power source operationally connected to provide DC power to a pair of bus bars in said DC busway.

24. The stand-alone DC power distribution system of claim 23, wherein said high voltage DC power source is selected from the group consisting of:
   wind power;
   solar power; and
   fuel cell power.

* * * * *